United States Patent

Stolzer et al.

[15] 3,691,277

[45] Sept. 12, 1972

[54] PHOSPHORYLATED AND PHOSPHONYLATED DERIVATIVES OF MERCAPTOACETIC ACID-N',N'-DIALKYLHYDRAZIDES

[72] Inventors: Claus Stolzer, Wuppertal-Elberfeld; Ingeborg Hammann, Cologne; Gunter Unterstenhofer, Opladen, all of Germany

[73] Assignee: Farbenfabriken Bayer Aktiengesellschaft, Leverkusen, Germany

[22] Filed: April 21, 1970

[21] Appl. No.: 30,577

[30] Foreign Application Priority Data

April 23, 1969 Germany..........P 19 20 506.2

[52] U.S. Cl. ..................260/923, 260/973, 260/979, 260/984, 424/211
[51] Int. Cl............C07f 9/16, C07f 9/38, A01n 9/36
[58] Field of Search.......................................260/923

[56] References Cited

UNITED STATES PATENTS 3,518,327   6/1970   Fearing et al..............260/923

*Primary Examiner*—Joseph Rebold
*Assistant Examiner*—Anton H. Sutto
*Attorney*—Burgess, Dinklage & Sprung

[57] ABSTRACT

Phosphorylated and phosphonylated derivatives of mercaptoacetic acid-N',N'-dialkylhydrazides, which are alkyl-or aryl-substituted in the 2-position, i.e. alkyl-esters of phosphoric or alkyl phosphonic (thiono) thiol acids attached through the thiol group to the 2-carbon of an alkyl-or aryl-substituted acetic acid whose carbonyl group is bound up as a dialkyl hydrazide, which possess arthropodicidal, especially acaricidal and insecticidal, properties, and processes for their production.

10 Claims, No Drawings

PHOSPHORYLATED AND PHOSPHONYLATED DERIVATIVES OF MERCAPTOACETIC ACID-N',N'-DIALKYLHYDRAZIDES

The present invention relates to and has for its objects the provision of particular new phosphorylated and phosphonylated derivatives of mercaptoacetic acid-N',N'-dialkylhydrazides, which are alkyl-or aryl-substituted in the 2-position, i.e. alkyl-esters of phosphoric or alkyl phosphonic (thiono) thiol acids attached through the thiol group to the 2-carbon of an alkyl-or aryl-substituted acetic acid whose carbonyl group is bound up as a dialkyl hydrazide, which possess anthropodicidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, especially insects and acarids, with other and further objects becoming apparent from a study of the within specification and accompanying examples.

It is known from Belgian Pat. Specification No. 579,855 and USSR Pat. Specifications Nos. 181,441, 185,913 and 191,265 that O,O-dialkylthiolphosphoric acid-S-(N,N-dialkylamino-carbamyl)-methyl esters and their thionothiol homologues possess insecticidal and acaricidal action.

It is also known from Belgian Pat. Specification No. 713,363 that O,O-dialkyl-(thiono)thiolphosphoric acid-S-(hydrazidocarbonyl)-methyl esters and alkyl-(thiono)-thiolphosphonic acid -O-alkyl-S-(hydrazidocarbonyl)-methyl esters possess an insecticidal and acaricidal action.

It has now been found, in accordance with the present invention, that the particular new phosphorylated and phosphonylated derivatives of mercaptoacetic acid-N',N'-dialkylhydrazides which are alkyl-substituted and/or aryl-substituted in the 2-position of the formula:

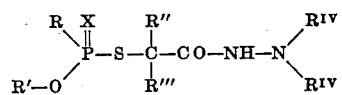

(I)

in which
R is optionally halogen-substituted alkyl or alkoxy with one to six carbon atoms or optionally substituted aryl,
R' is alkyl with one to six carbon atoms,
R'' is hydrogen or lower alkyl,
R''' is lower alkyl or aryl,
$R^{IV}$ each is the same or different lower alkyl, and
X is oxygen or sulphur,
exhibit strong arthropodicidal, especially insecticidal and acaricidal, properties.

It has been furthermore found, in accordance with the present invention, that the particular new compounds of formula (I) above may be produced by several different processes.

In one variant,
a. an alkali metal, alkaline earth metal or ammonium salt of an O,O-dialkylmono- or -dithiophosphoric acid or alkyl- or aryl-mono- or -dithiophosphonic acid-O-alkyl ester of the general formula

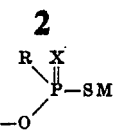

(II)

in which
R, R' and X have the significance given above, and
M is an alkali metal or alkaline earth metal equivalent or an ammonium group,
is reacted with a haloacetic acid ester of the general formula:

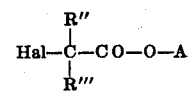

(III)

in which
Hal is chlorine or bromine,
A is optionally substituted alkyl or phenyl, and
R'' and R''' have the significance given above, so as to produce an ester of the formula:

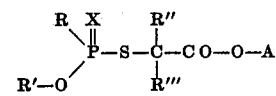

(IV)

and this ester is aminolyzed by means of a N,N-dialkyl-hydrazine of the formula

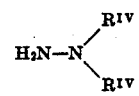

(V)

in which
$R^{IV}$ has the abovementioned significance, to give the product of formula (I), or in another variant, b. an alkali metal, alkaline earth metal or ammonium salt of formula (II) is reacted with a haloacetic acid-N',N'-dialkylhydrazide of the formula

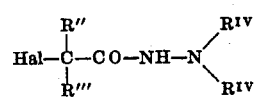

(VI)

in which
Hal, R'', R''' and $R^{IV}$ have the significance given above, or c. an alkali metal, alkaline earth metal or ammonium salt of formula (II) is reacted in a single-pot reaction first with a haloacetic acid halide of the formula

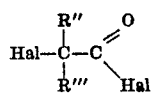

(VII)

in which
Hal, R'',R''' have the abovementioned significance, and thereafter with a N,N-dialkylhydrazine of formula (V), optionally in the presence of an acid-binding agent, or d. an O,O-dialkyl(thiono)phosphoric acid halide or its phosphonic analogue of the formula

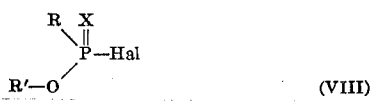
(VIII)

in which

R, R', X and Hal have the abovementioned significance, is reacted, in the presence of an acid-binding agent, with a 2-mercaptocarboxylic acid-N',N'-dialkylhydrazide of the formula

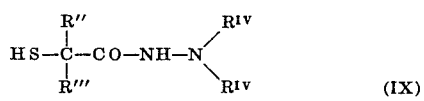
(IX)

in which

R'', R''' and R$^{IV}$ have the abovementioned significance.

Surprisingly, those phosphorylated or phosphonylated derivatives of mercaptoacetic acid-N',N'-dialkylhydrazides which are alkyl-substituted and/or aryl-substituted in the 2-position in accordance with the invention show a significantly better insecticidal and acaricidal as well as systemic activity than the O,O-dialkyl-(thiono)thiolphosphoric acid-S-(hydrazidocarbonyl)-methyl esters and alkyl-(thiono)thiolphosphonic acid-O-alkyl-S-(hydrazidocarbonyl)-methyl esters which are the nearest known active substances of the same type of activity. The compounds of the present invention therefore represent a valuable contribution to the art.

Where the sodium salt of O-ethyl-ethyl-dithiophosphonic acid and 2-bromopropionic acid phenyl ester are used as starting materials in accordance with process variant (a), the course of the first reaction can be represented by the following formula scheme:

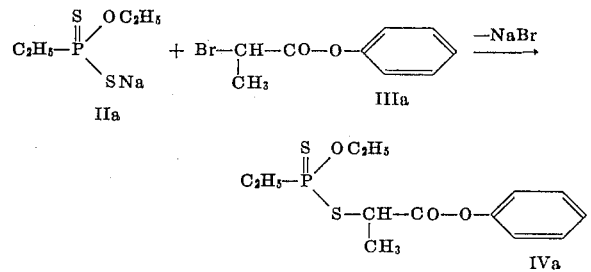

In the second reaction stage, the ester IVa obtained above is reacted with N,N-dimethylhydrazine:

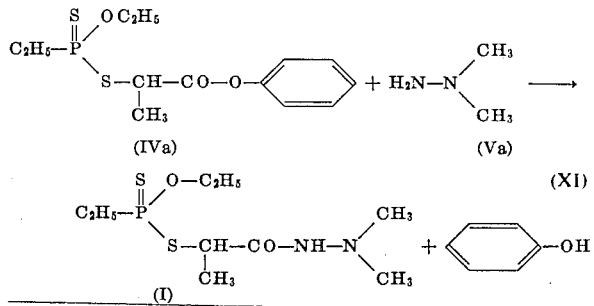

The phenol which is liberated may be removed by washing with alkali solution.

Process variants (b), (c) and (d) can be formulated correspondingly.

The alkali metal, alkaline earth metal or ammonium salts required for the manufacture of the substances according to the invention in accordance with process variants (a), (b) and (c) are defined by formula (II).

The haloacetic acid esters which are alkyl-substituted and/or aryl-substituted in the 2-position, which are required for the manufacture according to process variant (a), are defined by formula (III).

A is preferably methyl or phenyl in formulas (III) and (IV).

The N,N-dialkylhydrazines required in process variants (a) and (c) are defined by formula (V).

Advantageously, in accordance with the present invention, in the various formulas herein:

R represents optionally chlorine-substituted alkyl or alkoxy with 1–4 carbon atoms or phenyl optionally substituted by chlorine, bromine or lower alkyl such as methyl, ethyl, n- and iso-propyl, n-, iso-, sec.- and tert.-butyl, and the corresponding alkoxy radicals, their chlorine-substituted counterparts, chlorophenyl, bromophenyl, tolyl, ethylphenyl, dimethylphenyl, and the like;

R' represents lower alkyl of 1–4 carbon atoms such as methyl to tert.-butyl inclusive as defined above, and the like, and especially $C_{1-3}$ or $C_{1-2}$ alkyl;

R'' represents hydrogen, methyl or ethyl,

R''' represents methyl, ethyl or phenyl, and

R$^{IV}$ represents lower alkyl of 1–3 carbon atoms as defined above, and especially methyl.

In formulas (III), (VI), (VII) and (VIII) Hal is preferably chlorine or bromine.

The starting substances (II), (III), (V), (VI), (VII), (VIII) and (IX) are known.

Process variant (a) is especially suitable for the manufacture of the substances according to the invention. Approximately equimolar amounts of salts of formula (II) and 2-chloro or 2-bromo-carboxylic acid esters are generally allowed to react in the first reaction stage; sometimes it is advisable to employ the salts of the formula (II) in excess. The reaction normally takes place at 0° to 100° C, preferably 20° to 70° C. The reaction may take place in the presence of a solvent. Organic solvents which are inert under the reaction conditions may be used, especially those of polar nature such as alcohols, ketones, acetonitrile and water. The isolation of the intermediate of the formula (IV) may be effected; this may be done (if water is not already used as a solvent) by pouring the reaction mixture into water, taking up the oily products of the formula (IV) in a solvent which is immiscible with water, such as benzene, toluene, dichloromethane or ether, washing until a neutral reaction is obtained, drying the organic phase, filtering off and concentrating the filtrate. The products of the formula (IV) are then, in the second reaction stage, reacted with a N,N-dialkylhydrazine of the formula (V), generally in a molar ratio of about 1:2, generally at temperatures of 0° to 100° C, preferably 20° to 40° C. An excess of N,N-dialkylhydrazine is necessary to ensure quantitative aminolysis. Possible solvents for this reaction are all solvents which are inert towards the reactants, preferably chlorinated aliphatic hydrocarbons such as dichloromethane and trichloromethane. In many cases it is advantageous to dispense entirely with solvents during the aminolysis. In order to isolate the active substances of formula (I), the reaction mixture, in one of the inert solvents mentioned, may be freed from the alcohol produced by washing with water, and may be freed from the phenol produced by washing with dilute caustic alkali solution; the organic phase may be dried, the drying agent filtered off and the filtrate concentrated.

The substances according to the invention are systemic insecticides and acaricides of great potency. In particular, numerous insects and mites which are resistant towards conventional insecticides can be combated with them. Additionally some of the compounds possess a certain rodenticidal action. The pesticidal action starts rapidly and is long-lasting. The products may therefore be successfully employed in crop protection and in the protection of stored products, and also in the hygiene field, for combating harmful sucking and biting insects, Diptera and mites (Acari).

To the sucking insects contemplated herein there being, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*);in addition, scales and mealybugs (Coccina), for example the oleander scale (*Aspidiotus hederae*) and the soft scale (*Lecanium hesperidum*) as well as the grape mealy-bug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia Kuhniella*) and greater wax moth (*Galleria mellonella*); and the like.

Also to be classed with the biting insects contemplated herein are beetles (Coleoptera), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*), the leather beetle (*Dermestes frischi*), the Khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), and also species living in the soil, for example wireworms (*Agriotes* spec.) and larvae of the cockchafer (*Melolontha melolontha*); cockroaches, such as the German cockroach (*Blatella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black cockroach (*Blaberus fuscus*) as well as *Henschoutedenia flexivitta;* further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the Malaria mosquito (*Anopheles stephensi*); and the like.

With the mites (Acari) contemplated herein there are classed, in particular, the spider mites (Tetranychidae) such as the two-spotted spider mite (*Tetranychus telarius* = *Tetranychus althaeae* or *Tetranychus urticae*) and the European red mite (*Paratetranychus pilosus* - *Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When used against hygiene pests and pests of stored products, especially flies and midges, the products of the process are furthermore distinguished by an excellent residual action on timber and clay and good stability to alkali on lime-washed substrates.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanol-amine, etc.), ethers, ether-alcohols, (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents, (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.00001–20 percent, preferably 0.01–5 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95 percent, and preferably 0.01–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g. about 20–100 percent by weight of the active compound.

Furthermore, the present invention contemplates methods of selectively killing, combating or controlling pests, e.g. arthropods, i.e. insects and acarids, and more particularly methods of combating at least one of insects and acarids which comprises applying to at least one of correspondingly (a) such insects, (b) such acarids, and (c) the corresponding habitat thereof, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Plutella test
Solvent: 3 parts by weight of acetone
Emulsifier: 1 part by weight of alkylaryl polyglycol ether To produce a suitable preparation of the particular active compound, 1 part by weight of the active compound is mixed with the stated amount of solvent containing the stated amount of emulsifier and the concentrate is diluted with water to the desired final concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100 percent means that all the caterpillars are killed whereas 0 percent means that none of the caterpillars are killed.

The active compounds, the concentration of the active compounds, the evaluation times and the results can be seen from Table 1.

TABLE 1.—INSECTS WHICH ARE HARMFUL TO PLANTS

[Plutella test]

| Active compounds | Active compound concentration, percent | Degree of destruction in percent after 3 days |
|---|---|---|
| 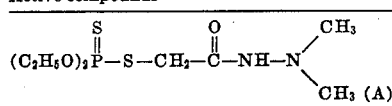 (known) | 0.1 | 0 |
| 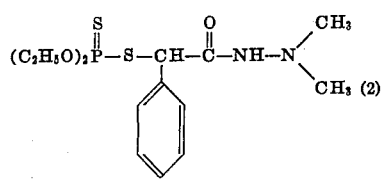 | 0.1 | 100 |
| 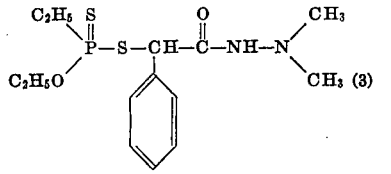 | 0.1<br>0.01 | 100<br>100 |
| 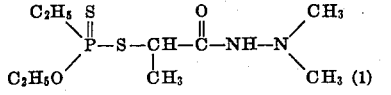 | 0.1 | 95 |
| 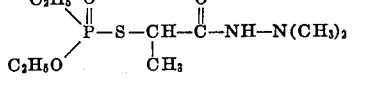 | 0.1 | 100 |
| 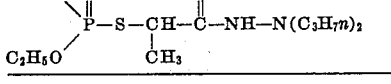 | 0.1<br>0.01 | 100<br>90 |

EXAMPLE 2

Myzus test (contact action)
Solvent: 3 parts by weight of acetone
Emulsifier: 1 part by weight of alkylaryl polyglycol ether To produce a suitable preparation of the particular active compound, 1 part by weight of the active compound is mixed with the stated amount of solvent containing the stated amount of emulsifier and the concentrate is diluted with water to the desired final concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100 percent means that all the aphids are killed whereas 0 percent means that none of the aphids are killed.

The active compounds, the concentrations of the active compounds, the evaluation times and the results can be seen from Table 2.

TABLE 2.—INSECTS WHICH ARE HARMFUL TO PLANTS

[Myzus test]

| Active compounds | Active compound concentration, percent | Degree of destruction in percent after 24 hours |
|---|---|---|
| 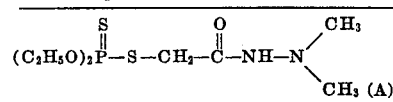 (known) | 0.1<br>0.01 | 95<br>30 |
| 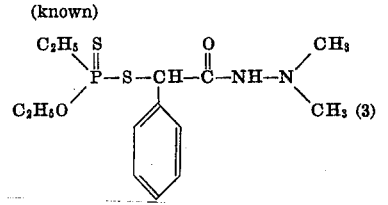 | 0.1<br>0.01<br>0.001<br>0.0001 | 100<br>99<br>90<br>40 |

TABLE 2.—INSECTS WHICH ARE HARMFUL TO PLANTS
[Myzus test]

| Active compounds | Active compound concentration, percent | Degree of destruction in percent after 24 hours |
| --- | --- | --- |
| $(C_2H_5O)_2\overset{S}{\underset{\|}{P}}-S-\underset{\underset{CH_3}{\|}}{CH}-\overset{O}{\underset{\|}{C}}-NH-N\underset{CH_3}{\overset{CH_3}{\diagdown}}$ (4) | 0.1<br>0.01 | 100<br>90 |
| $\underset{C_2H_5O}{\overset{C_2H_5}{\diagdown}}\overset{S}{\underset{\|}{P}}-S-\underset{\underset{CH_3}{\|}}{CH}-\overset{O}{\underset{\|}{C}}-NH-N\underset{CH_3}{\overset{CH_3}{\diagdown}}$ (1) | 0.1<br>0.01<br>0.001 | 100<br>100<br>100 |
| $\underset{C_2H_5}{\overset{C_2H_5O}{\diagdown}}\overset{O}{\underset{\|}{P}}-S-\underset{\underset{CH_3}{\|}}{CH}-\overset{O}{\underset{\|}{C}}-NH-N(CH_3)_2$ | 0.1<br>0.01<br>0.001<br>0.0001 | 100<br>100<br>100<br>40 |
| $\underset{C_2H_5O}{\overset{C_2H_5}{\diagdown}}\overset{S}{\underset{\|}{P}}-S-\underset{\underset{CH_3}{\|}}{CH}-\overset{O}{\underset{\|}{C}}-NH-N(C_3H_7n)_2$ | 0.1<br>0.01<br>0.001 | 100<br>100<br>20 |

EXAMPLE 3

Doralis test (systemic action)
Solvent: 3 parts by weight of acetone
Emulsifier: 1 part by weight of alkylaryl polyglycol ether To produce a suitable preparation of the particular active compound, 1 part by weight of the active compound is mixed with the stated amount of solvent containing the stated amount of emulsifier, and the concentrate is diluted with water to the desired final concentration.

Bean plants (*Vicia faba*) which have been heavily infested with the bean aphid (*Doralis fabae*) are watered with the preparation of the active compound so that the preparation of the active compound penetrates into the soil without wetting the leaves of the bean plants. The active compound is taken up by the bean plants from the soil and so reaches the infested leaves.

After the specified periods of time, the degree of destruction is determined as a percentage. 100 percent means that all the aphids are killed; 0 percent means that none of the aphids are killed.

The active compounds, the concentrations of the active compounds, the evaluation times and the results can be seen from Table 3.

TABLE 3.—INSECTS WHICH ARE HARMFUL TO PLANTS
[Doralis test—systemic action]

| Active compounds | Active compound concentration, percent | Degree of destruction in percent after 4 days |
| --- | --- | --- |
| $(C_2H_5O)_2\overset{S}{\underset{\|}{P}}-S-CH_2-\overset{O}{\underset{\|}{C}}-NH-N\underset{CH_3}{\overset{CH_3}{\diagdown}}$ (A)<br>(known) | 0.01<br>0.001 | 100<br>0 |
| $\underset{C_2H_5O}{\overset{C_2H_5}{\diagdown}}\overset{S}{\underset{\|}{P}}-S-CH_2-\overset{O}{\underset{\|}{C}}-NH-N\underset{CH_3}{\overset{CH_3}{\diagdown}}$ (B)<br>(known) | 0.01<br>0.001 | 100<br>0 |
| $\underset{C_2H_5O}{\overset{C_2H_5}{\diagdown}}\overset{S}{\underset{\|}{P}}-S-\underset{\underset{CH_3}{\|}}{CH}-\overset{O}{\underset{\|}{C}}-NH-N\underset{CH_3}{\overset{CH_3}{\diagdown}}$ (1) | 0.01<br>0.001 | 100<br>100 |
| $\underset{C_2H_5O}{\overset{C_2H_5}{\diagdown}}\overset{O}{\underset{\|}{P}}-S-\underset{\underset{CH_3}{\|}}{CH}-\overset{O}{\underset{\|}{C}}-NH-N(CH_3)_2$ | 0.1<br>0.01<br>0.001<br>0.0001 | 100<br>100<br>100<br>100 |

EXAMPLE 4

Myzus test (systemic long-term action)
Solvent: 3 parts by weight of acetone
Emulsifier: 1 part by weight of alkylaryl polyglycol ether To produce a suitable preparation of the particular active compound, 1 part by weight of the active compound is mixed with the stated amount of solvent containing the stated amount of emulsifier, and the concentrate is diluted with water to the desired concentration of 0.025 percent of active compound.

Cabbage plants (*Brassica oleracea*) are watered with 50 ml each of the preparation of the active compound, so that the preparation of the active compound penetrates into the soil without wetting the leaves of the cabbage plants. The active compound is taken up by the cabbage plants from the soil and so reaches the leaves. 12.5 mg of active compound are used per 100 g of soil (weighed air-dry).

After the specified periods of time, the plants are infested with aphids (*Myzus persicae*) and their destruction was in each case determined after 3 days. Herein 100 percent means that all aphids have been killed and 0 percent means that none of the aphids have been killed.

The active compounds, the concentrations of the active compounds, the evaluation times and the results can be seen from Table 4.

TABLE 4.—INSECTS WHICH ARE HARMFUL TO PLANTS
[Long-term action after watering: *Myzus persicae*/cabbage (*Brassicae oleracea*)]

| Active compounds | Mg. of active compound per 100 g. of soil (weighed airdry) | Percent destruction after (days)— | | | | | | | | | | | | | | |
|---|---|---|---|---|---|---|---|---|---|---|---|---|---|---|---|---|
| | | 3 | 6 | 10 | 13 | 17 | 20 | 24 | 27 | 31 | 34 | 38 | 41 | 45 | 48 | 52 |
| $\begin{array}{c}C_2H_5O\\ \diagdown\\ P-S-CH_2-\overset{O}{\overset{\|}{C}}-NH-N\diagup\overset{CH_3}{\diagdown CH_3}\\ \diagup\\ C_2H_5O\end{array}$ (A) (known) | 12.5 | 100 | 100 | 100 | 98 | 60 | 30 | 0 | | | | | | | | | |
| $\begin{array}{c}C_2H_5\\ \diagdown\\ P-S-CH-\overset{O}{\overset{\|}{C}}-NH-N\diagup\overset{CH_3}{\diagdown CH_3}\\ \diagup\;\;\;\;\;\;\;\|\\ C_2H_5O\;\;\;\;\;\;CH_3\end{array}$ (1) | 12.5 | 100 | 100 | 100 | 100 | 100 | 100 | 100 | 100 | 100 | 100 | 100 | 100 | 100 | 100 | 100 |

EXAMPLE 5

Myzus Test (long-term action after spraying)
Solvent: 3 parts by weight of acetone
Emulsifier: 1 part by weight of alkylaryl polyglycol ether To produce a sutiable preparation of the particular active compound, 1 part by weight of the active compound is mixed with the stated amount of emulsifier and the concentrate is diluted with water to the desired final concentration.

Cabbage plants (*Brassica oleracea*) are sprayed with the preparation of the active compound until dripping wet.

After the specified periods of time, the plants are infested with aphids (*Myzus persicae*) and their destruction is in each case determined after 3 days. Herein 100 percent denotes that all the aphids have been killed and 0 percent means that none of the aphids have been killed.

The active compounds, the concentrations of the active compounds, the evaluation times and the results can be seen from Table 5.

TABLE 5.—INSECTS WHICH ARE HARMFUL TO PLANTS
[Long-term action after spraying: *Myzus persicae*/cabbage (*Brassica oleracea*)]

| Active compounds | Percent active compound in the spraying liquor | Percent destruction after (days)— | |
|---|---|---|---|
| | | 3 | 6 |
| $\begin{array}{c}C_2H_5O\\ \diagdown\\ P-S-CH_2-\overset{O}{\overset{\|}{C}}-NH-N\diagup\overset{CH_3}{\diagdown CH_3}\\ \diagup\\ C_2H_5O\end{array}$ (A) (known) | 0.05 | 100 | 60 |
| $\begin{array}{c}C_2H_5\\ \diagdown\\ P-S-CH-\overset{O}{\overset{\|}{C}}-NH-N\diagup\overset{CH_3}{\diagdown CH_3}\\ \diagup\;\;\;\;\;\;\|\\ C_2H_5O\;\;\;\;CH_3\end{array}$ (1) | 0.05 | 100 | 100 |

EXAMPLE 6

Hercinothrips Test (systemic long-term action)
Solvent: 3 parts by weight of acetone
Emulsifier: 1 part by weight of alkylaryl polyglycol ether To produce a suitable preparation of the particular active compound, 1 part by weight of the active compound is mixed with the stated amount of solvent containing the stated amount of emulsifier and the concentrate is diluted with water to the desired final concentration of 0.025 percent of active compound.

Bean plants (*Phaseolus vulgaris*) are each watered with 50 ml of the preparation of the active compound so that the preparation of the active compound penetrates into the soil without wetting the leaves of the bean plants. The active compound is taken up by the bean plants from the soil and so reaches the infested leaves.

After the specified periods of time, the plants are infested with thrips (*Hercinothrips femoralis*) and their destruction was in each case determined after 3 days. Herein 100 percent means that all thrips have been killed and 0 percent means that no thrips have been killed.

The active compounds, the concentrations of the active compounds, the evaluation times and the results can be seen from Table 6.

TABLE 6.—INSECTS WHICH ARE HARMFUL TO PLANTS
[Long-term action after watering: *Hercinothrips femoralis/Phaseolus vulgaris*]

| Active compounds | Mg. of active compound per 100 g. of soil (weighed air-dry) | Percent destruction after (days)— | | |
|---|---|---|---|---|
| | | 27 | 34 | 41 |
| $\begin{array}{c}C_2H_5O\\ \phantom{xx}\diagdown\\ \phantom{xxx}P-S-CH_2-C-NH-N\\ \diagup\\ C_2H_5\end{array}\begin{array}{c}S\\ \|\end{array}\begin{array}{c}O\\ \|\end{array}\begin{array}{c}CH_3\\ \diagup\\ \diagdown\\ CH_3\end{array}$ (B) (known) | 12.5 | 100 | 60 | 50 |
| $\begin{array}{c}C_2H_5O\\ \phantom{xx}\diagdown\\ \phantom{xxx}P-S-CH_2-C-NH-N\\ \diagup\\ C_2H_5O\end{array}\begin{array}{c}S\\ \|\end{array}\begin{array}{c}O\\ \|\end{array}\begin{array}{c}CH_3\\ \diagup\\ \diagdown\\ CH_3\end{array}$ (A) (known) | 12.5 | 100 | 100 | 30 |
| $\begin{array}{c}C_2H_5\\ \phantom{xx}\diagdown\\ \phantom{xxx}P-S-CH-C-NH-N\\ \diagup\phantom{xxxxx}\|\\ C_2H_5O\phantom{xxxx}CH_3\end{array}\begin{array}{c}S\\ \|\end{array}\begin{array}{c}O\\ \|\end{array}\begin{array}{c}CH_3\\ \diagup\\ \diagdown\\ CH_3\end{array}$ (1) | 12.5 | 100 | 100 | 85 |

The following further examples are set forth to illustrate, without limitation, the process for producing the active compounds according to the present invention.

EXAMPLE 7

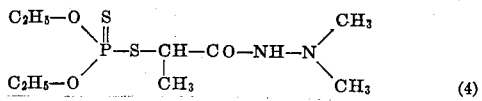

(4)

A solution of 79.5 g (10 g excess) of sodium O,O-diethyldithiophosphate in 500 ml of acetonitrile is mixed with 76.5 g of 2-bromopropionic acid phenyl ester at 20° to 30° C while stirring. The mixture is further stirred overnight at room temperature and poured into water, the oil which has separated out is taken up in benzene, the benzene solution is washed until it reacts neutral, the organic phase is dried over sodium sulphate, the drying agent is filtered off and the filtrate is concentrated. The yield of O,O-diethyl-thionothiol-phosphoric acid-S-(1-carbophenoxy)-ethyl ester is 103.5 g (92.8 percent of theory). 100g of the resulting intermediate product are mixed at 20° to 30° C with 36.0 g of N,N-dimethylhydrazine while stirring. The reaction mixture is further stirred overnight at room temperature and then taken up in dichloromethane, the solution is washed with dilute cold sodium hydroxide solution until free of phenol and subsequently with water until it reacts neutral, the organic layer is dried over sodium sulphate, the drying agent is filtered off and filtrate is concentrated. After driving off the remnants of solvent under reduced pressure, O,O-diethylthionothiolphosphoric acid-S-1-(N',N'-dimethylhydrazidocarbonyl)-ethyl ester is obtained as a colorless crystalline product of melting point 74° C. The yield is 27.8 g (31.0 percent of theory).

Analysis:
Calculated for $C_9H_{21}N_2O_3PS_2$
(molecular weight 300):

| | P | S |
|---|---|---|
| | 10.33% | 21.34% |
| Found: | 10.37% | 21.34% |

EXAMPLE 8:

The compound is manufactured analogously to that of Example 7 from sodium O,O-diethyl-dithiophosphate, α-bromophenylacetic acid phenyl ester and N,N-dimethyl-hydrazine. The O,O-diethylthionothiolphosphoric acid-S-1-(N',N'-dimethylhydrazidocarbonyl)-1-(phenyl)-methyl ester is obtained as a colorless crystalline product of melting point 97° C. The yield is 39.5 percent of theory.

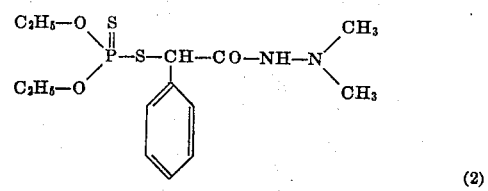

(2)

Analysis:
Calculated for $C_{14}H_{23}N_2O_3PS_2$
(molecular weight 362.5):

| | P | S |
|---|---|---|
| | 8.55% | 17.67% |
| Found: | 8.56% | 17.47% |

EXAMPLE 9:

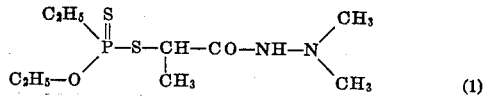

(1)

The compound is manufactured analogously to that of Example 7 from sodium O-ethyl-ethyl-dithiophosphonate, 2-bromopropionic acid phenyl ester and N,N-dimethyl-hydrazine. Ethylthionothiolphosphonic acid-O-ethyl-S-1-(N',N'-dimethylhydrazidocarbonyl)-ethyl ester is obtained as a brown oil of refractive index $n_D^{25} = 1.5336$.
Yield: 81.0 percent of theory.

Analysis:
Calculated for $C_9H_{21}N_2O_2PS_2$
(molecular weight 284.5):

| | P | S |
|---|---|---|
| | 10.90% | 22.50% |
| Found: | 10.99% | 21.48% |

EXAMPLE 10:

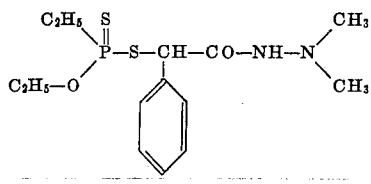

(3)

The compound is manufactured analogously to that of Example 7 from sodium O-ethyl-ethyldithiophosphonate, α-bromophenylacetic acid phenyl ester and N,N-dimethyl-hydrazine. Ethylthionothiolphosphonic acid-O-ethyl-S-1-(N',N'-dimethylhydrazidocarbonyl)-1-(phenyl)-methyl ester is obtained as colorless crystals of melting point 95° C.
Yield: 32.7 percent of theory.

Analysis:
Calculated for $C_{14}H_{23}N_2O_2PS_2$
(molecular weight 346.5):

|  | P | S |
|---|---|---|
|  | 8.95% | 18.48% |
| Found: | 9.10% | 18.34% |

EXAMPLE 11:

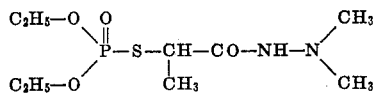

(5)

The compound is manufactured analogously to that of Example 7 from sodium O,O-diethyl-monothiophosphate, 2-bromopropionic acid phenyl ester and N,N-dimethyl-hydrazine. O,O-diethylthiolphosphoric acid-S-1-(N',N'-dimethylhydrazidocarbonyl)-ethyl ester is obtained as a brown oil of refractive index $n_D^{19} = 1.4882$.
Yield: 43.7 percent of theory.

Analysis:
Calculated for $C_9H_{21}N_2O_4PS$
(molecular weight 284.3):

|  | P | S |
|---|---|---|
|  | 10.90% | 11.27% |
| Found: | 10.92% | 10.51% |

EXAMPLE 12:

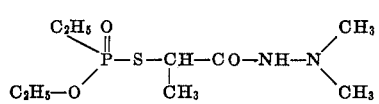

(6)

The compound is manufactured analogously to that of Example 7 from sodium O-ethyl-ethyl-monothiophosphonate, 2-bromopropionic acid phenyl ester and N,N-dimethyl-hydrazine. Ethylthiolphosphonic acid-O-ethyl-S-1-(N',N'-dimethylhydrazidocarbonyl)-ethyl ester is obtained as a brown oil of refractive index $n_D^{27} = 1.4972$.
Yield: 36.9 percent of theory.

Analysis:
Calculated for $C_9H_{21}N_2O_3PS$
(molecular weight 268.3):

|  | P | S |
|---|---|---|
|  | 11.56% | 11.93% |
| Found: | 10.65% | 11.54% |

EXAMPLE 13:

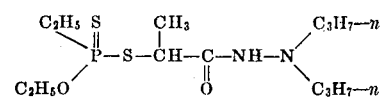

(7)

54.3 g (0.22 mol) of 2-bromopropionic acid-N,N-di-n-propylhydrazide dissolved in 100 ml of acetonitrile are added dropwise at 20°–25° to a solution of 45.0 g (0.22 mol + excess) of potassium O-ethyl-ethyl-dithiophosphonate in 300 ml of acetonitrile. The mixture is further stirred overnight, taken up in benzene and washed with water until neutral, and the benzene is dried over sodium sulphate, filtered and concentrated. After driving off the remnants of solvent under reduced pressure, ethylthionothiolphosphonic acid-O-ethyl-S-1-(N',N'-di-n-propyl-hydrazidocarbonyl)-ethyl ester is obtained as a brown oil of refractive index $N_D^{24.5} = 1.5171$.
Yield: 38.9 g (52.8 percent of theory).

EXAMPLE 14:

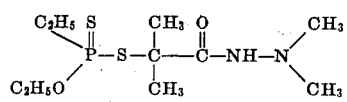

(8)

106 g (0.508 mol) α-bromoisobutyric acid-N,N-dimethyl-hydrazide dissolved in 300 ml of acetonitrile are added dropwise at 20°–25° to a solution of 105 g (0.508 mol + excess) of potassium O-ethyl-ethyl-dithiophosphonate in 400 ml of acetonitrile. The mixture is further stirred at 40° overnight, taken up in dichloromethane, washed with water until neutral, dried over sodium sulphate, filtered and concentrated. The oily residue is taken up in a solution of benzene/acetone (proportion of volumes 7 : 3) and slowly filtered over kieselguhr. The last portions of the filtrate contain the compound of the above formula. Ethylthionothiolphosphonic acid-O-ethyl-S-2-(N',N'-dimethylhydrazidocarbamyl)-isopropyl ester is obtained by evaporation as colorless crystals of melting point 56°–58°.
Yield: 32.5 percent of the theory Analysis:
Calculated for $C_{10}H_{23}N_2O_2PS_2$

| (molecular weight 298.4): | P | S |
|---|---|---|
|  | 10.38 | 21.50 |
| Found: | 10.08 | 21.09 |

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What we claim is:

1. An alkyl or aryl substituted phosphorylated and phosphonylated derivative of mercaptoacetic acid N',N'-dialkylhydrazide of the formula

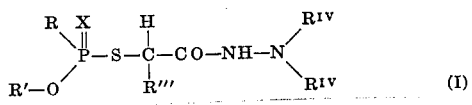

in which
R is alkyl or alkoxy with one to four carbon atoms,
R' is alkyl with one to six carbon atoms,
R''' is methyl or phenyl,
R$^{IV}$ each is the same or different lower alkyl, and
X is oxygen or sulphur.

2. Compound according to claim 1 in which R' is alkyl with 1–4 carbon atoms; R'' is hydrogen, methyl or ethyl; and R$^{IV}$ is alkyl with 1–3 carbon atoms.

3. Compound according to claim 2 in which R is alkyl or alkoxy with 1–4 carbon atoms, R'' is hydrogen, and R$^{IV}$ is methyl.

4. Compound according to claim 1 wherein such compound is O,O-diethyl-thionothiolphosphoric acid-S-1-(N',N'-dimethylhydrazidocarbonyl)-1-(phenyl)-methyl ester of the formula

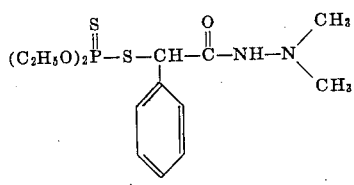

5. Compound according to claim 1 wherein such compound is ethylthionothiolphosphonic acid-O-ethyl-S-1-(N',N'-dimethylhydrazidocarbonyl)-1-(phenyl)-methyl ester of the formula

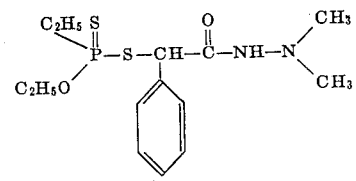

6. Compound according to claim 1 wherein such compound is ethylthionothiolphosphonic acid-O-ethyl-S-1-(N',N'-dimethylhydrazidocarbonyl)-ethyl ester of the formula

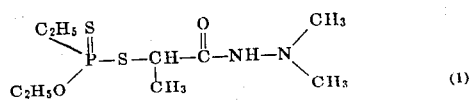

7. Compound according to claim 1 wherein such compound is O,O-diethylthionothiolphosphoric acid-S-1-(N',N'-dimethylhydrazidocarbonyl)-ethyl ester of the formula

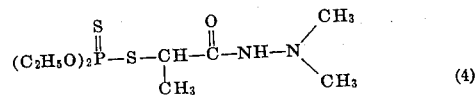

8. Compound according to claim 1 wherein such compound is O,O-diethylthiolphosphoric acid-S-1-(N',N'-dimethylhydrazidocarbonyl)-ethyl ester of the formula

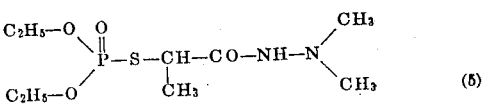

9. Compound according to claim 1 wherein such compound is ethylthiolphosphonic acid-O-ethyl-S-1-(N',N'-dimethyl-hydrazidocarbonyl)-ethyl ester of the formula

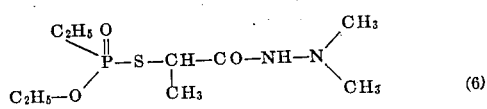

10. Compound according to claim 1 wherein such compound is ethylthionothiolphosphonic acid-O-ethyl-S-1-(N',N'-di-n-propylhydrazidocarbonyl)-ethyl ester of the formula

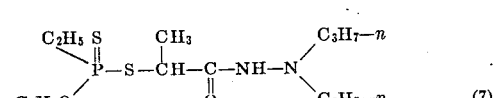

* * * * *

UNITED STATES PATENT OFFICE
CERTIFICATE OF CORRECTION

Patent No. 3,691,277      Dated September 12, 1972

Inventor(s) Claus Stolzer et al

It is certified that error appears in the above-identified patent and that said Letters Patent are hereby corrected as shown below:

Col. 1, line 13

"anthropodicidal" should be -- arthropodicidal --.

Col. 17, line 44

The no. "10.90% should be moved to the right to fall under "P".

Col. 19, lines 23-24 delete "R"... ethyl;".

Signed and sealed this 8th day of May 1973.

(SEAL)
Attest:

EDWARD M. FLETCHER, JR.
Attesting Officer

ROBERT GOTTSCHALK
Commissioner of Patents